(12) United States Patent
Srivastava et al.

(10) Patent No.: US 7,434,041 B2
(45) Date of Patent: Oct. 7, 2008

(54) INFRASTRUCTURE FOR VERIFYING CONFIGURATION AND HEALTH OF A MULTI-NODE COMPUTER SYSTEM

(75) Inventors: Alok Kumar Srivastava, Newark, CA (US); Dipak Saggi, Fremont, CA (US); Babak Hamadani, San Mateo, CA (US); Sambit Mishra, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 472 days.

(21) Appl. No.: 11/209,515

(22) Filed: Aug. 22, 2005

(65) Prior Publication Data

US 2007/0044077 A1 Feb. 22, 2007

(51) Int. Cl.
*G06F 9/445* (2006.01)

(52) U.S. Cl. .................. 713/1; 713/2; 713/100; 717/101; 717/126

(58) Field of Classification Search .............. 713/1, 713/100, 2
See application file for complete search history.

(56) References Cited

U.S. PATENT DOCUMENTS

| | | | |
|---|---|---|---|
| 5,495,610 A | 2/1996 | Shing et al. | |
| 5,832,503 A | 11/1998 | Malik et al. | |
| 5,838,918 A | 11/1998 | Prager et al. | |
| 5,968,176 A | 10/1999 | Nessett et al. | |
| 6,047,323 A | 4/2000 | Krause | |
| 6,098,098 A | 8/2000 | Sandahl et al. | |
| 6,108,782 A | 8/2000 | Fletcher et al. | |
| 6,167,445 A | 12/2000 | Gai et al. | |
| 6,205,482 B1 | 3/2001 | Navarre et al. | |
| 6,247,128 B1 | 6/2001 | Fisher et al. | |
| 6,301,613 B1 * | 10/2001 | Ahlstrom et al. | 709/223 |
| 6,321,267 B1 | 11/2001 | Donaldson | |
| 6,341,287 B1 | 1/2002 | Sziklai et al. | |
| 6,405,251 B1 | 6/2002 | Bullard et al. | |

(Continued)

FOREIGN PATENT DOCUMENTS

FR    2 801 705 A1    6/2001

(Continued)

OTHER PUBLICATIONS

Oracle Corporation, "Oracle Real Application Clusters 10g Diagnostics and Verification," An Oracle White Paper, Nov. 2003, pp. 1-13.

(Continued)

*Primary Examiner*—Nitin C Patel
(74) *Attorney, Agent, or Firm*—Hickman Palermo Truong & Becker

(57) ABSTRACT

A verification infrastructure uses a verification tool with a user interface with which a user may interact to verify an application and/or its platform. The user may enter the same set of commands to verify instances of the application on different platforms. Furthermore, the verification tool is data driven in a way that allows the verification tool to be easily extended to new platforms. Finally, details of a particular configuration are stored persistently and are used by the verification tool to perform verification. Thus, much of the complex work of acquiring knowledge about the configuration and applying the knowledge to the results of various checks made for verification is performed by the verification tool and not a human user.

44 Claims, 3 Drawing Sheets

U.S. PATENT DOCUMENTS

| | | | |
|---|---|---|---|
| 6,490,574 B1 | 12/2002 | Bennett et al. | |
| 6,502,131 B1 | 12/2002 | Vaid et al. | |
| 6,581,093 B1 | 6/2003 | Verma | |
| 6,598,057 B1 | 7/2003 | Synnestvedt et al. | |
| 6,643,652 B2 | 11/2003 | Helgeson et al. | |
| 6,675,370 B1 | 1/2004 | Sundaresan | |
| 6,691,138 B1 | 2/2004 | Kirkpatrick et al. | |
| 6,728,723 B1 * | 4/2004 | Kathail et al. | 707/102 |
| 6,735,630 B1 | 5/2004 | Gelvin et al. | |
| 6,754,699 B2 | 6/2004 | Swildens et al. | |
| 6,760,761 B1 | 7/2004 | Sciacca | |
| 6,775,697 B1 | 8/2004 | Surazski et al. | |
| 6,785,713 B1 | 8/2004 | Freeman et al. | |
| 6,816,903 B1 | 11/2004 | Rakoshitz et al. | |
| 6,834,298 B1 | 12/2004 | Singer et al. | |
| 6,847,993 B1 | 1/2005 | Novaes et al. | |
| 6,892,231 B2 * | 5/2005 | Jager | 709/220 |
| 6,892,235 B1 | 5/2005 | Daude et al. | |
| 6,898,618 B1 | 5/2005 | Slaughter et al. | |
| 6,917,929 B2 | 7/2005 | Teloh et al. | |
| 6,968,389 B1 | 11/2005 | Menditto et al. | |
| 6,981,029 B1 | 12/2005 | Menditto et al. | |
| 6,983,321 B2 | 1/2006 | Trinon et al. | |
| 6,995,675 B2 | 2/2006 | Curkendall et al. | |
| 7,076,547 B1 | 7/2006 | Black | |
| 7,089,263 B2 * | 8/2006 | Arnold et al. | 707/104.1 |
| 7,257,635 B2 * | 8/2007 | Chellis et al. | 709/226 |
| 7,305,393 B2 * | 12/2007 | Seeger et al. | 707/9 |
| 2002/0083343 A1 | 6/2002 | Crosbie et al. | |
| 2002/0099806 A1 | 7/2002 | Balsamo et al. | |
| 2002/0145981 A1 | 10/2002 | Klinker et al. | |
| 2002/0178380 A1 | 11/2002 | Wolf et al. | |
| 2003/0033400 A1 | 2/2003 | Pawar et al. | |
| 2003/0065762 A1 | 4/2003 | Stolorz et al. | |
| 2003/0097564 A1 | 5/2003 | Tewari et al. | |
| 2003/0115456 A1 | 6/2003 | Kapoor | |
| 2003/0154279 A1 | 8/2003 | Aziz | |
| 2003/0177025 A1 | 9/2003 | Curkendall et al. | |
| 2006/0040648 A1 * | 2/2006 | Vikman et al. | 455/414.1 |
| 2006/0085155 A1 | 4/2006 | Miguelanez et al. | |
| 2006/0123016 A1 * | 6/2006 | Ashok et al. | 707/100 |
| 2006/0143608 A1 | 6/2006 | Dostert et al. | |
| 2006/0212422 A1 | 9/2006 | Khilani et al. | |
| 2006/0282471 A1 * | 12/2006 | Mark et al. | 707/200 |

FOREIGN PATENT DOCUMENTS

| | | | |
|---|---|---|---|
| WO | WO 01/75677 A1 | 10/2001 | |

OTHER PUBLICATIONS

IBM, IBM Journal of Research and Development [online], retrieved on Feb. 14, 2006. Retrieved from the Internet: <URL: http://www.research.ibm.com/journal/rd/492/wazlowski.html>, pp. 1-18.

Cai, Jack, "Oracle Real Application Clusters 10g Diagnostics and Verification," An Oracle White Paper, Nov. 2003, 12 pages.

Chun, Brent N., "PSSH-HOWTO," located at <http://theether.org/pssh/>, retrieved on Jun. 19, 2006, 7 pages.

Clusterit, "Welcome to clusterit-2.4!," located at <http://clusterit.sourceforge.net/>, retrieved on Jun. 19, 2006, 4 pages.

Netsupport Inc., "NetSupport Manager v 9.50—Overview," retrieved from the internet at http://www.netsupport-inc.com/nsm/netsupport_manager_overview.htm, retrieved on Jun. 19, 2006, 4 pages.

NixCraft, "nixCraft Tips & Tricks—Execute Commands on Multiple Linux or Unix Servers," located at http://www.cyberciti.biz/nixcraft/vivek/blogger/2005/12/execute-commands-on-linux-or.php, retrieved on Jun. 19, 2006, 5 pages.

NixCraft, "nixCraft Tips & Tricks—Execute Commands on Multiple Linux or Unix Servers part II," retrieved from the internet at http://www.cyberciti.biz/nixcraft/vivek/blogger/2005/12/execute-commands-on-linux-or_27.php, retrieved on Jun. 19, 2006, 8 pages.

NixCraft, "nixCraft Tips & Tricks—Execute Commands on Multiple Hosts Using Expect Tool Part III," located at http://www.cyberciti.biz/nixcraft/vivek/blogger/2006/01execute-commands-on-multiple-hosts.php, retrieved on Jun. 19, 2006, 4 pages.

Scriptlogic, "Desktop Authority—Version: 7.05," located at http://www.scriptlogic.com/products/desktopauthority/, retrieved on Jun. 19, 2006, 2 pages.

Warthawg, "Execute Commands Simultaneously on Multiple Servers," Linux.com, located at: http://www.linux.com/print.pl?sid=06/02/13/1413229, Feb. 20, 2006, 2 pages.

"Office Action" received in related case U.S. Appl. No. 09/998,095 dated Jan. 29, 2008, 14 pages.

State Intellectual Property Office of P.R.C., "Notification of the First Office Action", app No. 02823795.1, dated Nov. 10, 2006, 8 pages.

Claims, App. No. 02823795.1, 11 pages, Nov. 10, 2006.

European Patent office, "Communication pursuant to Article 96(2) EPC", App. No. 02804452.7, dated May 31, 2006, 3 pages.

Claims, App. No. 02804452.7, 6 pages, May 31, 2006.

International Searching Authority, "Notification of Transmittal of the International Search Report or the Declaration", dated Mar. 2, 2004, 7 pages.

* cited by examiner

| STAGES | | Verify Node Connectivity | Verify Shared Storage Visibility | Verify System Requirements | Verify Administrative Privileges | Verify Space Availability | Verify CFSI Integrity | Verify Cluster Manager Integrity | Verify Cluster Integrity | Verify OCR Integrity | Verify Daemon Liveliness | Verify CRS Integrity | Verify Peer Compatibility | Verify Shared Storage Exclusivity |
|---|---|---|---|---|---|---|---|---|---|---|---|---|---|---|
| HARDWARE AND OS SETUP | PRE | | | | | | | | | | | | | |
| | POST | X | X | | X | | | | | | | | | |
| CLUSTER FILE SYSTEM SETUP | PRE | X | X | X | X | X | | | | | | | | |
| | POST | | | | | | X | | | | | | | |
| CLUSTER SERVICES SETUP | PRE | X | X | X | X | X | X | | | | | | | |
| | POST | | | | | | | X | X | X | X | X | | |
| DATABASE INSTALLATION | PRE | X | | X | X | X | X | X | | | | X | | |
| | POST | | | | | | | | | | | | | |
| DATABASE CONFIGURATION | PRE | X | X | X | X | X | | | | | | X | | |
| | POST | | | | | | | | | | | | | |
| NODE ADDITION | PRE | | X | X | | | | X | | | | | X | |
| | POST | X | X | | | | | X | | | | | | |
| STORAGE ADDITION | PRE | | | | | | | | | | | | | |
| | POST | | X | | | | | | | | | | | X |
| NETWORK MODIFICATION | PRE | | | | | | | | | | | | | |
| | POST | X | | | | | | X | | | | | | |

FIG. 2

INFRASTRUCTURE FOR VERIFYING CONFIGURATION AND HEALTH OF A MULTI-NODE COMPUTER SYSTEM

FIELD OF THE INVENTION

The present invention relates to verifying the configuration and operability of multi-component computer systems.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

No application can live alone. To run on a computer system, an application requires the presence of other software and hardware components ("external components") on the computer system and that the external components be installed and configured in a particular way. In addition, the application itself may be comprised of many "internal components" that must also be installed and configured in a particular way. For a particular application, the combination of external and internal components and its configuration is referred to herein as the system configuration.

A system configuration can be very complex. One example of such a system configuration is the configuration of a cluster that hosts a clustered database server. A clustered database server is a database server that runs on a cluster of nodes, referred to herein as a database cluster. Nodes in a cluster may be in the form of computers (e.g. work stations, personal computers) interconnected via a network. Alternatively, the nodes may be the nodes of a grid, where each node is interconnected on a rack. Each node in a database cluster shares direct access to shared-storage resources, such as a set of disks, or a file stored on the disk.

In order to operate correctly and optimally, a clustered database server requires specific storage and network subsystem connectivity, and certain operating system attribute settings. For example, the storage subsystem should be shared between the nodes of a database cluster that host the clustered database server, and there should be at least one private interconnect between the nodes in the cluster.

The task of verifying the configuration and operability of external components and internal components of an application is referred to herein as verification. Verification of external components and internal components of an application occurs throughout the life time of the application.

For example, deployment of an application occurs in stages. Each stage may involve installation and configuration of one or more external and internal components. Deployment of a clustered database server, in particular, entails such stages as a) setup of node interconnect, b) setup of shared-storage system, or c) layout of data files.

The initiation of a stage can depend on the successful completion of one or more other stages. Certain criteria must be satisfied before initiating a stage, i.e. "entry criteria" and after completing the stage, i.e. "exit criteria". Verification is performed to determine whether the exit or entry criteria are satisfied.

Once initially formed, a clustered database server may continue to evolve, by, for example, adding or replacing nodes in the cluster or upgrading the database server to a new version. Such evolution occurs in stages as well and requires verification to determine whether entry and exit criteria are satisfied.

Finally, bugs and errors may be encountered as an application runs. Resolving such issues often requires verification to determine whether an application and its platform are configured correctly.

Verification is Complicated

Verification of an application, such as a database server, requires a potpourri of tools that are typically provided by vendors of various components. For example, an operating system vendor may provide tools for verifying the operating system, the network vendor may provide tools for verifying the network, and the database vendor may provide tools for verifying individual components. Each tool tests specific components of a system configuration or aspects of those components. To resolve a particular configuration issue, a database administrator ("DBA") may have to use multiple tools of different vendors. Thus, a DBA responsible for verification of a clustered database server must be familiar with a large number of tools, greatly complicating the task of performing verification.

Not only must the DBA be familiar with multiple tools, the DBA must be knowledgeable about details of the configuration of the database server. Thus, to perform verification, the DBA must be capable of understanding, comprehending, and analyzing many tools and many details of the configuration of a clustered database server.

The verification is further complicated if the DBA is responsible for maintaining multiple clustered database servers for multiple platforms. For example, a DBA may support a database cluster that runs on a first operating system product and another database cluster that runs on a second operating system product. As a result, the DBA may need to be familiar with the operating system tools of two operating system vendors and the configurations of multiple database clusters.

Based on the foregoing, there is a clear need for a way to simplify verification for an application, particularly applications with complex interdependencies between internal and external components.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a diagram depicting a mapping between stage verifications and verification tasks according to an embodiment of the present invention.

DETAILED DESCRIPTION OF THE INVENTION

Figure 1:
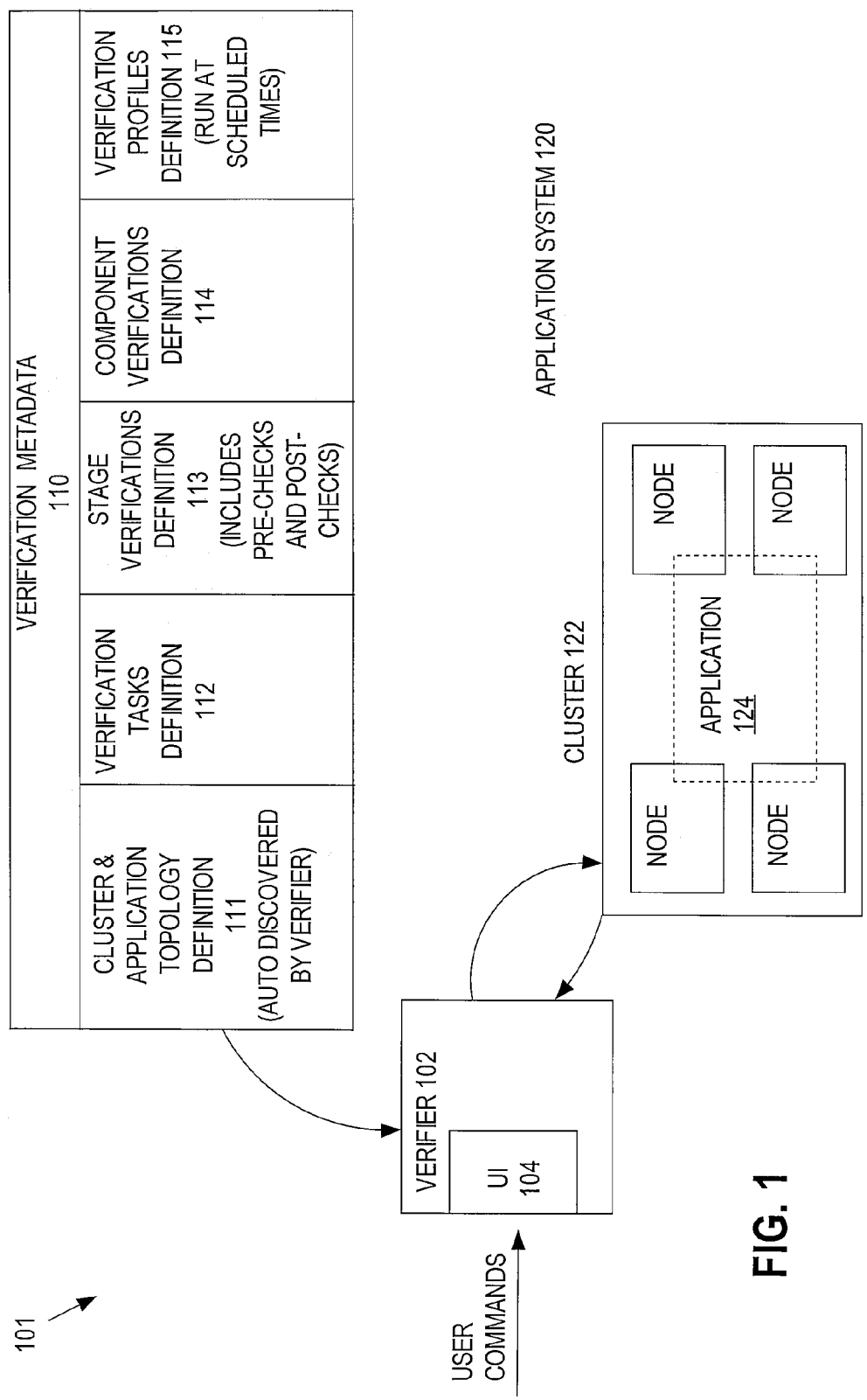
FIG. 1 is a block diagram of a verification architecture according to an embodiment of the present invention.

Platform independent infrastructures for verification are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

According to an embodiment, the verification infrastructure uses a verification tool with a user interface with which a user may interact to verify an application and/or its platform. The user may enter the same set of commands to verify instances of the application on different platforms. Furthermore, the verification tool is data driven, allowing the verification tool to be easily extended to new platforms. Finally, details of a particular configuration are stored persistently and are used by the verification tool to perform verification. Thus, much of the complex work of acquiring and maintaining knowledge about the configuration and applying the knowledge to the results of various checks made for verification is performed by the verification tool and not a human user.

The approaches are illustrated using a database cluster. However, the present invention is not so limited.

The verification infrastructure is based on the following.

Component A component is a unit of software and/or hardware, which may include one or more other components. Applications, operating systems and software drivers are examples of software components. A computer is an example of component that can be made of many components, such as a network card or persistent storage device. Components can comprise both hardware and software. For example, a network component can be comprised of a network card and a software driver.

Application The term application, as used herein, is a set of software modules that is designed to be installed as a package and that depends on the previous installation and configuration of another software component, such as an operating system. The term application system refers to the combination of an application's internal and external components. Thus, a clustered database server and the cluster that hosts it is an example of an application system.

Platform A platform is a particular combination of external components used by an application. Typically, a platform includes a product and/or version of an operating system (e.g. Windows NT, Unix) and computer (e.g. Sun Workstation, Intel based Servers), and devices (e.g. different brands of network cards and persistent storage).

Verification Task A verification task is a high-level generalized representation of a verification of one or more components. Thus, a verification task is a logical encapsulation of operations undertaken to perform verification. The verification verifies some aspect of the operability and configuration of at least one component and/or the interoperability and configuration of two or more components. For example, a verification task could be SHARED-STORAGE-AVAILABILITY, which checks to see that all nodes in a cluster of a clustered database server may access shared persistent storage (e.g. a set of disk drives).

Verification tasks can be logically grouped and encapsulated as verification procedures. Verification procedures are the lowest level procedures that can be expressly requested by the end user. For example, a user may enter executable "verification statements" to the verification tool. The statements can request and refer to verification procedures but not verification tasks. According to an embodiment, verification procedures include stage verifications, component verifications, and verification profiles.

Stage Verification As mentioned earlier, deployment of an application system occurs in stages. Stage verification is a verification performed to determine whether a stage may be initiated or whether a stage is successfully completed. Stage verification includes "stage pre-checks" and "stage post-checks." Stage pre-checks are a set of one or more verification tasks performed to check whether entry criteria are satisfied. Stage post-checks are a set of one or more verification tasks performed to check whether exit criteria for a stage are satisfied.

Component Verification Component verification verifies a particular component within an application system. Component verification can include one or more verification tasks. A component verified by a component verification can include a single component or a multiple components, internal or external components, and/or a combination thereof.

Verification Profile Profiles are a user defined set of verification tasks. Verification profiles can be run according to a schedule. When scheduled, they are typically run periodically to verify that an application system is running and/or is running optimally.

Illustrative Verification Architecture

FIG. 1 is a block diagram depicting verification architecture 101 for verifying an application system according to an embodiment of the present invention. Referring to FIG. 1, verifier 102 is an application for verifying application system 120. Application system 120 includes application 124 and cluster 122, which hosts application 124. Cluster 122 includes multiply interconnected nodes.

According to an embodiment, application system 120 is a clustered database system that includes a database server hosted on a cluster of interconnected nodes; the nodes share access to a shared storage system that holds a database.

Verifier 102 includes user interface 104 through which a user may, for example, issue executable "verification statements" and input data used by verifier 102 to verify application system 120. A user may also view the results of verification through a user interface 104.

To determine how to verify application 122, verifier 102 relies on verification metadata 110. Verification metadata, such as verification metadata 110, is metadata that describes how an application system is verified. Verification metadata includes cluster and application topology definition 111, verification tasks definition 112, stage verifications definition 113, component verifications definition 114, and verification profiles definition 115.

Cluster and application topology definition 111 expresses and describes the topology that application system 120 should have. Specifically, the cluster and application topology definition 111 defines external components and internal components of the application system 120 and how they should be configured. For example, cluster and application topology definition 111 defines the member nodes of cluster 122, the operating system and network system that should be present (e.g. product and version), the amount of memory that should be available on the node, the application (e.g. product and version) hosted by cluster 122, the location of the shared storage, and the amount of space that should be available.

The topology can be generated, at least in part, through auto discovery. That is, verifier 102 automatically interacts with nodes in cluster 122 to determine which nodes are member nodes of cluster 122, and updates the cluster and application topology definition 111.

Verification tasks definition 112 defines verification tasks. A definition of a verification task includes an identifier and one or more verification-task routines that are called to perform the verification task. These routines are referred to herein as verification-task routines.

The verification tasks definition 112 also describes the output results returned by execution of a verification task. In general, the output returned by a verification task is based on the output generated by the verification-task routines. Verification tasks definition 112 also defines what output results constitute a successful verification.

Stage verifications definition 113 defines stage verifications. For a particular stage verification, stage verifications definition 113 defines an identifier for the stage, and one or more verification tasks that are performed as pre-checks and one or more verification tasks that performed as post-checks of the stage verification.

Component verifications definition 114 defines component verifications. For a particular component verification, component verifications definition 114 defines an identifier for the component verification, and one or more verification tasks that are performed for the component verification.

Verification profiles definition 115 defines verification profiles. For a particular verification profile, verification profiles definition 115 defines an identifier for the verification profile, and one or more verification tasks that are performed as part of the verification profile.

Verification profiles definition 115 may also define a schedule for running a verification profile. Verifier 102 carries out the schedule so defined. Carrying out the schedule may involve causing a scheduling system of application 124 or an operating system of a node of cluster 122 to run the verification routines associated with the verification tasks of a verification profile at a scheduled time.

According to an embodiment, verification metadata 110 is formatted based on the XML standard. However, the present invention is not so limited.

Verifier is Distributed

Execution of verification tasks may require execution of software modules on multiple nodes of cluster 122. According to an embodiment, software for verifier 102 is initially installed on a single node (or more), referred to herein as a local node. The other nodes are referred to as remote nodes with respect to verifier 102.

A verification task typically requires participation of remote nodes, which participate by executing software modules of verifier 102. However, in order for a remote node to participate in various verification tasks, some but not all of the software modules of verifier 102 needs be installed and executed on a remote node. The software modules that need to be executed on remote nodes to perform a verification task are referred to herein as remote support modules.

For example, a user issues a verification statement to verifier 102. Execution of the verification statement requires execution of a verification task for verifying that nodes of cluster 122 are able to access shared storage. Execution by the local node of the verification-task routine for the verification task causes the local node to remotely call a remote support module on the remote nodes; execution of the remote support module by a remote node causes the remote node to check whether the remote node may access the shared storage and report the results back to the local node. In order to carry out the verification task, the remote support modules should be deployed to the nodes in cluster 122. However, it is not necessary to deploy other software modules of verifier 102. Examples of software modules that do not need to be deployed to remote nodes include modules that parse the verification statement, determine what verification tasks to carry out, that cause remote execution of the verification routine, and that report the results to the user via user interface 104.

According to an embodiment, when a remote node does not have a remote software module and execution of the remote support module on the remote node is required to carry out a verification task, the remote support module is transported via a network to the remote node. Examples of remote support modules that are transported in this way are procedural functions and Java Objects. An embodiment of the present invention is, however, not limited to any particular language.

Command Line Interface

According to an embodiment, a user submits verification statements to verifier 102 through user interface 104. A verification statement includes a verification-procedure identifier that identifies a verification procedure. Stage verifications definition 113, component verifications definition 114 and verification profiles definition 115 define verification-procedure identifiers for their respective verification procedures. To illustrate, the following verification statement VS is provided.

-post hwos

Statement VS requests that verifier 102 perform postchecks for the stage verification called Hardware And Operating System. The verification-procedure identifier hwos identifies the stage verification.

When verifier 102 receives a verification statement, it parses the statement and breaks it down into statement elements, such as a verification-procedure identifier and parameters. Verifier 102 then examines verification metadata to determine how to carry out the verification procedure, determining what verification tasks to perform and what associated verification routines to execute. Verifier 102 executes the verification tasks associated with the verification procedure, invoking verification routines of the verification tasks. Execution of the verification task may require execution of routines on multiple nodes; verifier 102 remotely invokes the routines on each of the nodes. Finally, verifier 102 then presents the output generated by the verification to the user.

A command line interface is only one example of user interface that may be used in an embodiment of present invention. Other forms of user interfaces that can be used include graphical user interfaces.

In an embodiment, verifier 102 includes a public library of routines that can be accessed and executed to perform verification. The library of routines is exposed through an application programmer interface (API) that is accessible to, for example, clients of application 124. The routines provide support for various types of verifications, including stage verification and component verification, and even for specific verification tasks.

Common Verification Language

According to an embodiment of the present invention, verifier 102 can be installed on heterogeneous application systems and supports a common verification language for each of the heterogeneous application systems. Heterogeneous application systems are application systems that are on different platforms. A verification language is a standard that governs the format and command set for verification statements. Thus, the same verification statements are supported on different application system platforms.

Different implementations for verification routines and remote support modules are developed for each platform supported. To carry out a particular verification procedure, verifier 102 executes and/or deploys verification routines and remote support modules appropriate for an application system and its platform, based on information in verification metadata 110.

Thus, no matter the platform of an application system, a user may issue the same or similar verification statements for a verification procedure. Verifier 102 carries out the verification statement, performing the platform specific details in a way that is transparent to the user. The verification of heterogeneous application systems is thereby greatly simplified.

Data Driven Extensibility

Because the behavior of verifier 102 is driven by verification metadata 110, verifier 102 can be easily extended by modifying verification metadata 110. New verification tasks can be developed or extended to cover new platforms for an application. New verification routines and other software needed to support the verification tasks are first developed and then verification tasks definition 112 altered to associate new verification routines and other software with an existing or new verification task definition. New stage verifications can be developed by defining and associating them with verification tasks. Similarly, new component verifications and verification profiles may also be developed.

Verification metadata 110 can be altered through user interface 104. If verification metadata 110 conforms to XML, verification metadata 110 can be altered using any mechanism available for altering XML data, including, for example, a text editor.

Diagnostic Verification and Mode Procedures

According to an embodiment, verification metadata 110 includes diagnostic verification definitions that define diagnostic verification procedures undertaken to diagnosis problems with an application system. A diagnostic verification definition defines a decision tree with decision paths between points that represent verification procedures and/or tasks. The results of the verification procedures and tasks along a decision path are used to traverse a decision tree and arrive at a diagnosis.

The diagnostic verifications may be a version of a stage or component verification in which more verification tasks are performed to automatically make a diagnosis. The diagnostic version of the stage or component verifications are executed when verifier 102 is placed in a diagnostic mode by, for example, including a diagnostic mode command in the verification statement. The diagnostic versions may also be associated with a decision tree.

Illustrative Verification Tasks and Procedures

The following describes illustrative verification task definitions that may be used for a database cluster according to an embodiment of the present invention.

Verify Shared Storage Accessibility

This verification task verifies that the specified shared storage is accessible by the nodes of a cluster. This verification task can autodiscover all the available shared devices for a cluster and determine the degree of sharing among the nodes.

Verify Space Availability

This verification task verifies that shared storage in a cluster meets given space requirements.

Verify Shared Storage Exclusivity

This verification task verifies that the accessibility of the shared storage of a cluster is confined to the nodes of the cluster. This verification task is useful when adding a storage device to a cluster. The newly added device should be inaccessible to non-cluster members.

Verify Node Connectivity

This verification task verifies that a) reachability exists between the nodes of a cluster through public routes using TCP/IP protocol, b) connectivity exists between the nodes using specific network interfaces, and c) connectivity exists between a given set of endpoints specified by their IP addresses. The verification task autodiscovers all network interfaces configured for the nodes in a cluster and determines the connectivity between the nodes through each discovered interface.

Verify Cluster File System Integrity

This verification task verifies that a cluster's file system is working satisfactorily. This verification task may perform the following kinds of checks of a file system: a) mounting of a file system over the cluster's nodes, b) configuration and accessibility of underlying hardware components, c) liveliness of related drivers/services/daemons (i.e. whether they are running or being executed by a process), and d) installation of required software components.

Verify Cluster Manager Integrity

This verification task verifies that cluster synchronization services (CSS) are operational on a cluster. Liveliness of a CSS process is not enough to ensure the sound health of CSS. The following additional checks are performed to ensure sound health of CSS: a) ability to connect to CSS service, b) proper functioning of lock requests, and c) proper functioning of a group mechanism.

Verify CRS Integrity

This verification task verifies that the cluster stack is in good health on a given set of nodes. The cluster stack is the set of internal components that must be operating within a clustered database server.

Verify OCR Integrity

The OCR is a registry that stores very detailed information about the configuration of a database cluster and database server hosted thereon. Each node in a cluster may access the cluster registry. The verification task verifies that the OCR is properly identified on all the nodes and that data consistency between replica OCRs is maintained.

Verify Cluster Integrity

This verification task verifies that at a given point of time, the configuration of a cluster is intact, that is, all the nodes in the cluster are communicating and the cluster is not partitioned into sub-clusters each believing that it is the only partition.

Verify Daemon Liveliness

This verification task verifies that specific daemons or services are available in a cluster.

Verify Administrative Privileges

This verification task verifies that proper administrative privileges are available on a given set of nodes to perform a specific type of operation.

Verify Peer Compatibility

This verification task verifies that a given node or set of nodes is compatible with a reference cluster node. This verification task fetches properties of the reference node and verifies whether the properties match that of the given node.

Verify System Requirements

This verifies that the software and hardware requirements are met for a database server product and version. Each product and/or version has different predefined requirements. This verification task verifies that the cluster meets predefined requirements for the product and/or version.

Illustrative Stage Verification Definitions

The following describes stages and how stage verifications definitions are defined for the stages according to an embodiment of the present invention. FIG. 2 shows a mapping between the stages defined and verification tasks.

Hardware and Operating System Setup

This stage refers to the initial install and configuration of hardware and software components to make the cluster ready to host a clustered database server. This stage includes setup and configuration of network interconnects and shared storage components. Typical activities performed as part his stage include:

Establish physical/electrical connections between nodes.
Deploy operating system on cluster nodes.
Install network interface cards for private interconnect and public network.
Configure network interfaces to have proper addresses and network interface parameters.
Connect the nodes through private interconnect and public networks.
Setup physical disks or disk arrays and make them accessible from all the nodes of the cluster.

Pre-checks:
None
Post-checks:
User equivalence is established for all the nodes to support remote operations.
All the nodes are reachable using public network interfaces.
The shared storage devices are accessible from all the nodes.

Verification Tasks:
Verify Administrative Privileges (user equivalence).
Verify Node Connectivity.
Verify Shared Storage Accessibility.

Cluster File System Setup
This stage refers to the installation and configuration of a cluster's file system. Typical activities performed as part of this stage include:

Configure disk volumes.
Install file system components.
Configure desired cluster file system.
Mount cluster file system on cluster nodes.

Prerequisite Stages:
Hardware and Operating System Setup
Pre-checks:
The hardware and software requirements are met.
Shared disks are accessible from all the nodes of the cluster.
Sufficient space is available.
All the nodes are reachable using public network interfaces.
Proper administrative privileges exist as required for installing cluster file system.

Verification Tasks:
Verify Administrative Privileges.
Verify System Requirements.
Verify Administrative Privileges.
Verify Node Connectivity.
Verify Shared Storage Accessibility Post-checks:
Ensure that the cluster file system is operational on desired nodes.

Verification Tasks:
Verify cluster file system integrity (all nodes)

Cluster Services Setup
In this stage, the building blocks of the high availability infrastructure are installed and configured. Components like OCR, CSS, CRS are set up in this stage.

Typical Activities:
Install OCR
Installing OCR software to the appropriate locations.
Setting proper permissions on installed components.
Install CSS Prerequisite Stages:
Hardware and Operating System Setup
Cluster File System Setup (optional)
Pre-checks:
User equivalence exists for all the nodes.
Node connectivity among the member nodes is intact.
Shared storage is accessible from all the nodes.
Proper administrative privileges have been setup.
All the system requirements are met.

Verification Tasks:
Verify Administrative Privileges (user equivalence)
Verify Node Connectivity
Verify Shared Storage Visibility
Verify System Requirements
Verify Administrative Privileges (optional)
Verify CFS Integrity Post-checks:
Ensure that CSS is working properly.
Make sure the cluster is still properly formed and intact.
Verify that OCR and cluster stacks are operable.

Verification Tasks:
Verify Cluster Manager Integrity
Verify Cluster Integrity
Verify OCR Integrity
Verify CRS Integrity Database Installation
In this stage, database server software is copied to the desired location.

Typical Activities:
Interview to gather information.
Installation of software to the destination.
Set proper permissions for installed components.

Prerequisite Stages:
Hardware and Operating System setup
Cluster File System Setup (optional)
Cluster Services Setup
Pre-checks:
User equivalence exists for all the nodes.
Node connectivity among the members is intact.
Shared Storage is accessible from all the nodes.
Proper administrative privileges have been setup.
All the system requirements are met.
Cluster stacks are working properly.

Verification Tasks:
Verify Administrative Privileges (user equivalence)
Verify System Requirements
Verify Administrative Privileges
Verify Node Connectivity
Verify CFS Integrity (optional)
Verify CRS Integrity Post-checks:
None Cluster Node Addition
This stage adds a new node to an existing cluster. The node should be connected to other nodes and to the existing shared storage. The cluster management software on the new node is not operational yet. The following activities would have already taken place before entering this stage when the new node was prepared and added to the cluster in the hardware sense:

Prepare the new node by deploying proper operating system.
Connect new node's hardware to the existing cluster. This involves connecting to other nodes through private interconnects, connecting the node to a public network, and configuring this node to share the existing storage system with other nodes in the cluster.
Create users on this node with proper administrative privileges for accessing local as well as remote nodes.

Figure 3:
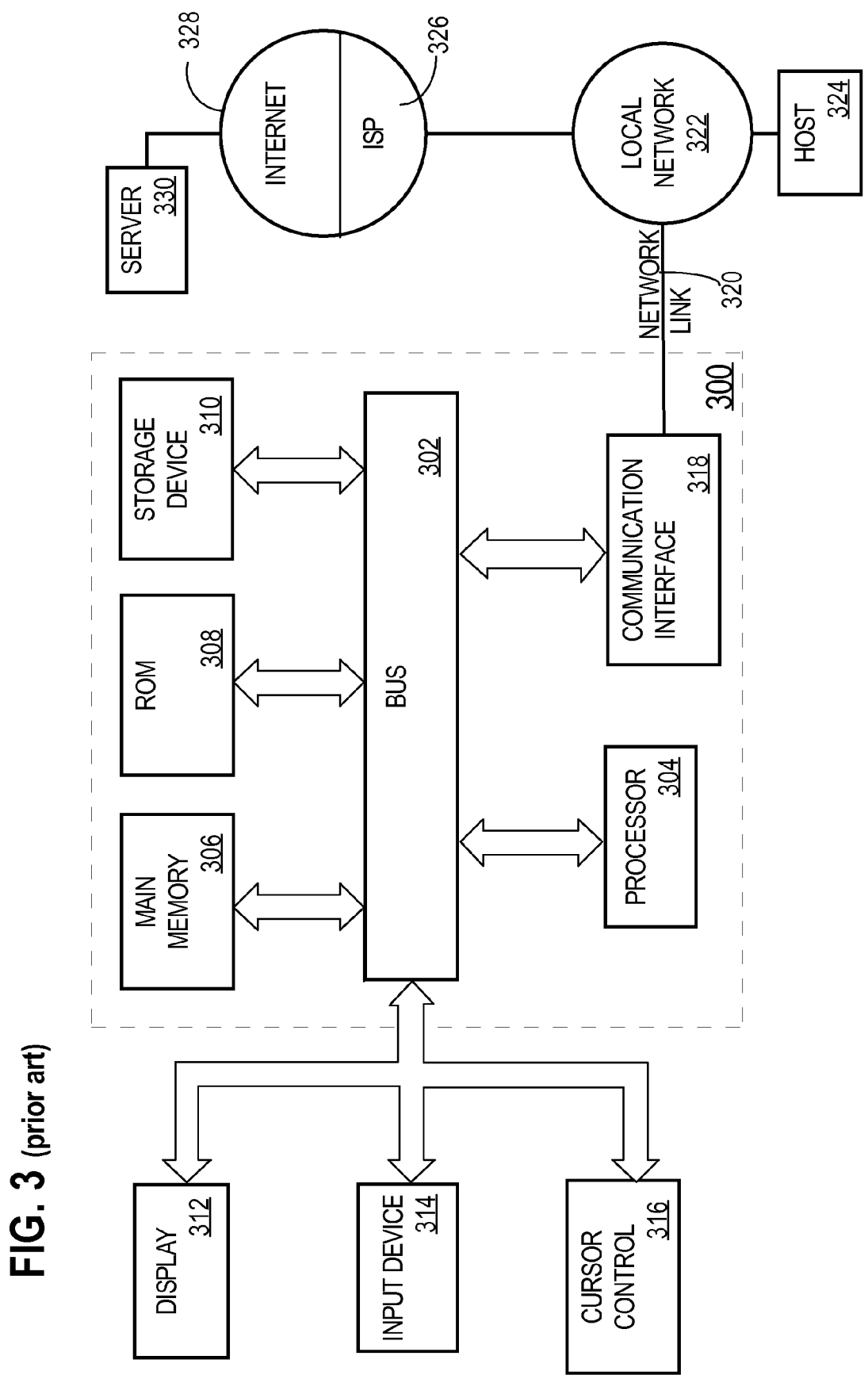
FIG. 3 is a block diagram of a computer system which may be used to implement an embodiment of the present invention.

The stage involves the following activities:
Install the same cluster management software on the new node as is on the other nodes of the cluster.
Make cluster management software on existing cluster nodes aware of the addition of the new node.
Make cluster management software on new node operational for joining the cluster.
Prerequisite Stages:
Hardware and Operating System Setup
Pre-checks:
The properties of the new node should be compatible with various properties of the existing nodes in cluster, e.g. like operating system and version. Also, the connectivity with existing nodes and accessibility to shared storage is verified. The cluster management software must be working properly.
Verification Tasks:
Verify Peer Compatibility (between new node and an existing cluster node)
Verify Cluster Manager Integrity
Verify Shared Storage Accessibility (new node)
Post-checks:
The cluster manager software is in a valid state and the new node is a part of the cluster.
Node connectivity is intact.
Verification Tasks:
Verify Node Connectivity (new node to all existing nodes)
Verify Shared Storage Accessibility (new node)
Verify Cluster Manager Integrity
Storage Addition
Additional storage can be added from time to time to meet the storage needs of the cluster. Activities like adding a new disk or partition fall in this stage.
Prerequisite Stages:
Hardware and Operating System Setup (optional)
Cluster File System Setup
Pre-checks:
None
Post-checks:
Newly added shared storage should be accessible from all the nodes.
Verification Tasks:
Verify Shared Storage Exclusivity (all nodes)
Verify Shared Storage Visibility
Network Modification
This stage includes updating an existing configuration of network components. This stage typically involves any of the following actions:
IP address for a network interface is changed.
New (public or high speed private) interconnect is added.
An interconnect is removed.
Prerequisite Stages:
Hardware and Operating System Setup
Pre-checks:
None.
Post-checks:
This post-check verifies that any activity in this stage leaves the cluster in a state where connectivity between all the nodes is intact.
Make sure cluster manager is working properly.
Verification Tasks:
Verify Node Connectivity
Verify Cluster Manager Integrity Hardware Overview FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for performing verification of a system that includes an application and a platform for the application, the method comprising:
    receiving a statement that requests execution of a verification operation that requires a certain verification of one or more components of the system, said statement identifying said verification operation and conforming to a verification language;
    in response to receiving the request, making an examination of metadata that defines:
        a topology of the system,
        a configuration of multiple components of the system, and
        a plurality of verification operations that include said verification operation, and for each of the plurality of verification operations, how to carry out said verification operation; and
    based on the examination of the metadata, performing the certain verification of one or more components of the system.

2. The method of claim 1, wherein said verification operation verifies a stage in a deployment of the application.

3. The method of claim 2, wherein said verification operation determines whether one or more criteria for initiating said stage is satisfied.

4. The method of claim 2, wherein said verification operation determines whether one or more criteria for completing said stage is satisfied.

5. The method of claim 1, wherein one or more components include one or more application components.

6. The method of claim 1, wherein the one or more components include one or more platform components.

7. The method of claim 1, wherein said metadata defines how to carry out the verification operation based on one or more platforms that include said platform.

8. The method of claim 7, wherein the one or more platforms include multiple platforms.

9. The method of claim 1, wherein:
    for each verification operation of the plurality of verification operations, the metadata defines an identifier that identifies said each verification operation; and
    receiving a request includes receiving a statement that includes the identifier for said verification operation.

10. The method of claim 1, wherein said metadata:
    defines a first set of verification tasks;
    defines said verification operation as a verification procedure comprised of the first set of verification tasks; and
    defines one or more other verification procedures comprised of said first set of verification tasks.

11. The method of claim 10, wherein said metadata defines how to carry out said first set of verification tasks for multiple platforms for said application.

12. The method of claim 10, wherein said metadata defines a second set of verification tasks to execute, in a diagnostic mode, for said verification procedure.

13. The method of claim 1, wherein:
    the topology of the system includes a plurality of nodes of a multi-node system; and
    wherein performing certain verification includes executing a particular verification operation at each of the plurality of nodes.

14. The method of claim 13, wherein:
    a remote support module resides on each of said plurality of nodes; and
    wherein performing certain verification includes transporting a particular remote support module in response to determining that the particular remote support module is needed to perform the particular verification operation of said certain verification.

15. The method of claim 14, wherein:
the plurality of nodes includes one or more remote nodes and a certain node;
a copy of the particular remote support module resides on the one or more remote nodes; and
execution of the copy causes a result of the particular verification operation to be reported to the certain node.

16. The method of claim 1, the method further including performing after the certain verification:
modifying the metadata to reflect a new topology of the system; and
performing another verification based on the new topology.

17. The method of claim 16, wherein the new topology includes a new node in a multi-node system.

18. The method of claim 16, wherein the new topology includes an application added to a node of the system.

19. The method of claim 1, the method further including performing after the certain verification:
modifying the metadata to reflect a new configuration of a component of said multiple components; and
performing another verification based on the new configuration.

20. The method of claim 1, the method further including performing after the certain verification:
modifying the metadata to reflect one or more new verification operations for verifying a new component of said system; and
performing another verification based on the one or more new verification operations.

21. The method of claim 1, further including:
receiving from a user data that defines a verification profile and one or more particular verification operations to perform for said verification profile;
receiving a request to perform said verification profile; and
in response to receiving said request, executing the one or more particular verification operations to perform for said verification profile.

22. The method claim 21, further including:
receiving data that defines a schedule for performing the verification profile; and
performing the verification profile according to the schedule.

23. A computer-readable storage medium carrying one or more sequences of instructions for performing verification of a system that includes an application and a platform for the application, which instructions, when executed by one or more processors, cause the one or more processors to carry out the steps of:
receiving a statement that requests execution of a verification operation that requires a certain verification of one or more components of the system, said statement identifying said verification operation and conforming to a verification language;
in response to receiving the request, making an examination of metadata that defines:
a topology of the system,
a configuration of multiple components of the system, and
a plurality of verification operations that include said verification operation, and for each of the plurality of verification operations, how to carry out said verification operation; and
based on the examination of the metadata, performing the certain verification of one or more components of the system.

24. The computer-readable storage medium of claim 23, wherein said verification operation verifies a stage in a deployment of the application.

25. The computer-readable storage medium of claim 24, wherein said verification operation determines whether one or more criteria for initiating said stage is satisfied.

26. The computer-readable storage medium of claim 24, wherein said verification operation determines whether one or more criteria for completing said stage is satisfied.

27. The computer-readable storage medium of claim 23, wherein one or more components include one or more application components.

28. The computer-readable storage medium of claim 23, wherein the one or more components include one or more platform components.

29. The computer-readable storage medium of claim 23, wherein said metadata defines how to carry out the verification operation based on one or more platforms that include said platform.

30. The computer-readable storage medium of claim 29, wherein the one or more platforms include multiple platforms.

31. The computer-readable storage medium of claim 23, wherein:
for each verification operation of the plurality of verification operations, the metadata defines an identifier that identifies said each verification operation; and
receiving a request includes receiving a statement that includes the identifier for said verification operation.

32. The computer-readable storage medium of claim 23, wherein said metadata:
defines a first set of verification tasks;
defines said verification operation as a verification procedure comprised of the first set of verification tasks; and
defines one or more other verification procedures comprised of said first set of verification tasks.

33. The computer-readable storage medium of claim 32, wherein said metadata defines how to carry out said first set of verification tasks for multiple platforms for said application.

34. The computer-readable storage medium of claim 32, wherein said metadata defines a second set of verification tasks to execute, in a diagnostic mode, for said verification procedure.

35. The computer-readable storage medium of claim 23, wherein:
the topology of the system includes a plurality of nodes of a multi-node system; and
wherein performing certain verification includes executing a particular verification operation at each of the plurality of nodes.

36. The computer-readable storage medium of claim 35, wherein:
a remote support module resides on each of said plurality of nodes; and
wherein performing certain verification includes transporting a particular remote support module in response to determining that the particular remote support module is needed to perform the particular verification operation of said certain verification.

37. The computer-readable storage medium of claim 36, wherein:
the plurality of nodes includes one or more remote nodes and a certain node;

a copy of the particular remote support module resides on the one or more remote nodes; and execution of the copy causes a result of the particular verification operation to be reported to the certain node.

38. The computer-readable storage medium of claim 23, the steps further including performing after the certain verification:

modifying the metadata to reflect a new topology of the system; and performing another verification based on the new topology.

39. The computer-readable storage medium of claim 38, wherein the new topology includes a new node in a multinode system.

40. The computer-readable storage medium of claim 38, wherein the new topology includes an application added to a node of the system.

41. The computer-readable storage medium of claim 23, the steps further including performing after the certain verification:

modifying the metadata to reflect a new configuration of a component of said multiple components; and performing another verification based on the new configuration.

42. The computer-readable storage medium of claim 23, the steps further including performing after the certain verification:

modifying the metadata to reflect one or more new verification operations for verifying a new component of said system; and performing another verification based on the one or more new verification operations.

43. The computer-readable storage medium of claim 23, the steps further including:

receiving from a user data that defines a verification profile and one or more particular verification operations to perform for said verification profile;

receiving a request to perform said verification profile; and in response to receiving said request, executing the one or more particular verification operations to perform for said verification profile.

44. The computer-readable storage medium claim 43, the steps further including:

receiving data that defines a schedule for performing the verification profile; and performing the verification profile according to the schedule.

* * * * *

UNITED STATES PATENT AND TRADEMARK OFFICE
CERTIFICATE OF CORRECTION

PATENT NO. : 7,434,041 B2  Page 1 of 1
APPLICATION NO. : 11/209515
DATED : October 7, 2008
INVENTOR(S) : Srivastava et al.

It is certified that error appears in the above-identified patent and that said Letters Patent is hereby corrected as shown below:

In column 9, line 2, delete "his" and insert -- this --, therefor.

Signed and Sealed this

Twentieth Day of April, 2010

David J. Kappos
*Director of the United States Patent and Trademark Office*